Feb. 4, 1941.   W. B. WELLS   2,230,853

LIGHT SIGNAL

Filed March 29, 1939

INVENTOR
Wesley B. Wells.
BY
HIS ATTORNEY

Patented Feb. 4, 1941

2,230,853

UNITED STATES PATENT OFFICE 2,230,853

LIGHT SIGNAL

Wesley B. Wells, Wilkinsburg, Pa., assignor to The Union Switch & Signal Company, Swissvale, Pa., a corporation of Pennsylvania Application March 29, 1939, Serial No. 264,799

2 Claims. (Cl. 177—329)

My invention relates to light signals, and particularly to light signals of the searchlight type which are capable of selectively projecting a plurality of beams of light of different colors from a single light source.

More particularly, my present invention relates to light units for searchlight signals of the type described, and has for an object to improve the adjustable light units described and claimed in Letters Patent of the United States No. 2,111,650, granted to myself and another on March 22, 1938, for Light signals.

Other objects and characteristic features of my invention will appear as the description proceeds.

I shall describe one form of light signals embodying my invention, and shall then point out the novel features thereof in claims.

Figure 1:
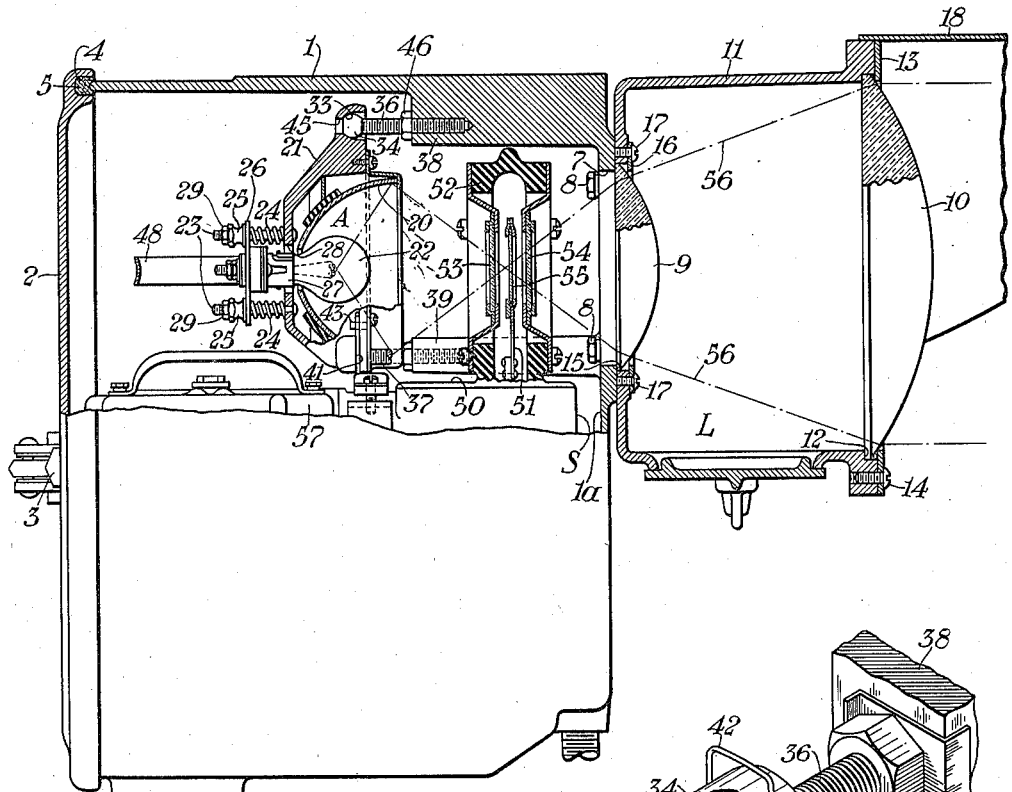
Figure 3:
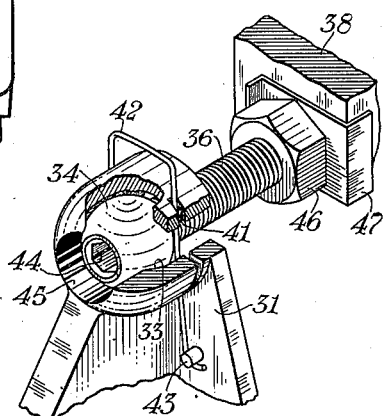
Figure 2:
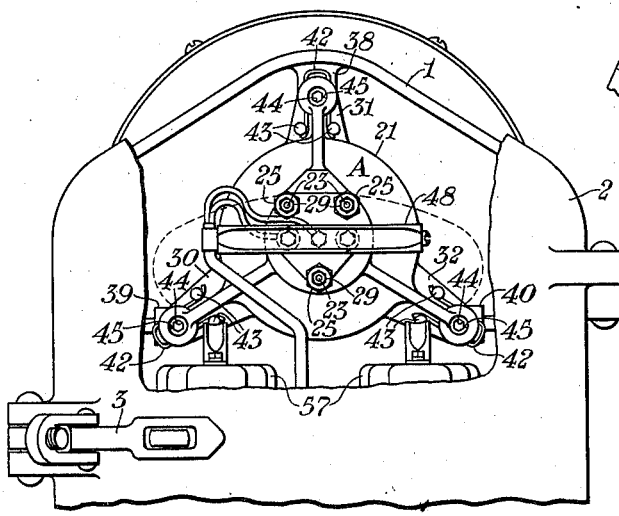

In the accompanying drawing, Fig. 1 is a view partly in side elevation and partly in vertical section, showing one form of light signal embodying my invention. Fig. 2 is a fragmentary rear elevational view of the signal shown in Fig. 1, a portion of the door being broken away to better illustrate the construction of the parts. Fig. 3 is a detail isometric view showing one of the mounting studs and cooperating parts of the reflector assembly embodying my invention.

Similar reference characters refer to similar parts in all three views.

Referring first to Figs. 1 and 2, the light signal in the form here shown comprises a box-like casing 1 provided with a hinged rear door 2 through which convenient access to the interior of the casing may be had. The door 2 is arranged to be fastened in its closed position by means of a suitable fastening device 3, and is provided on its rear face with a groove 4 for the reception of packing 5, which when the door is closed, engages the edge of the casing 1 and thus seals the casing against the entrance of dirt or other foreign substances.

Formed in the forward wall 1a of the casing 1 is a large circular opening 7 through which the light rays from a light unit A which is disposed inside of the casing are adapted to be projected, and secured to the forward wall 1a directly in front of the opening 7 by means of four screws 8 spaced 90° apart is a lens unit L for concentrating the light rays emitted by the light unit A into a signal beam. The lens unit L is of well-known construction and comprises a doublet consisting of two spaced lenses 9 and 10 mounted in the inner and outer ends, respectively, of a tubular casing 11, commonly referred to as a lens barrel. The outer lens 10 bears around its edges against the bottom of an annular groove 12 which is formed in the lens barrel, and is held in place by a ring member 13 and screws 14, a gasket of felt or the like preferably being interposed between the ring member and the edges of the lens. The inner lens 9 likewise bears at its edges against the bottom of an annular groove 15 which is formed in the inner end of the lens barrel, and is held in place by a ring member 16 and screws 17, a gasket of felt or the like being interposed between the ring member and the edges of the lens. The two lenses are of the well-known plano-convex type, and are both clear or colorless. Secured to the outer end of the lens barrel directly above the outer lens 10 is a hood 18 which performs the usual function of shielding the lens 10 from the direct rays of the sun.

The light unit A referred to hereinbefore comprises an elliptical reflector 20 mounted in a metal casing 21, and an electric lamp 22, the filament of which is located at one of the conjugate foci of the reflector 20. The rear wall of the casing 21 is provided with three rearwardly projecting studs 23 arranged in triangular formation, and mounted on these studs between compressed coil springs 24 which surround the shank portions of the studs, and nuts 25 which are adjustably screwed onto the outer end of the studs, is a plate 26. This plate carries a socket 27 which projects with some clearance through a hole 28 formed in the rear wall of the casing 21, and serves as a support for the previously referred to electric lamp 22. Mounted on the studs 23 outside of the nuts 25 are lock nuts 29 for securing the nuts 25 in adjusted positions. It will be apparent that by adjusting the nuts 25 the position of the lamp filament with respect to the reflector may be varied, and these nuts are so adjusted that the filament of the lamp will be located at the focal point of the reflector, thus enabling the maximum efficiency to be obtained from the light unit.

In accordance with my present invention, the reflector housing is provided with three radial arms 30, 31 and 32, each of which is formed with a socket 33. These sockets are adapted to receive the spherical heads 34 of three studs 35, 36 and 37 which are adjustably screwed into tapped holes formed in bosses 38, 39 and 40 formed at the top and two sides respectively of the casing 1, and the sockets are carefully machined to accurately fit the heads of the studs for a purpose which will become apparent hereinafter. Formed in the opposite sides of these sockets are saw cuts or slots 41, and extending into each socket through these saw cuts are the opposite sides of a U-shaped spring 42 which is held in place by pins 43. The saw cuts are so located that, when the heads of the studs have fully entered the slots the largest diameters of the heads will have passed the slots, and the sides of the springs are spaced apart distances which are less than the diameters of the heads.

It will be seen, therefore, that in order to insert the head of a stud into any one of the sockets, it will be necessary to force the two sides of the spring apart, and that when the head of a stud has fully entered a socket, the largest diameter of the head will have passed the spring, thereby permitting the spring to contract in a manner to force the head of the stud all of the way into the socket and thus yieldably hold it in place in the socket.

To permit ready adjustment of the ball studs while the reflector assembly is snapped in place, the head 34 of each stud is provided in its outer end with a hexagonal recess 44 for the reception of a wrench or other tool, and a hole 45 is provided in the outer end of each socket through which the tool may be inserted into the recess in the stud. The studs are arranged to be locked in their adjusted position by lock nuts 46 and lock washers 47 provided on the studs. To facilitate snapping the reflector in place onto the studs or removing it from the studs a handle 48 is provided.

The light signal also comprises a suitable operating mechanism S for changing the color of the beam emitted by the signal to provide a plurality of signal indications. As here shown, this mechanism is similar to that described and claimed in an application for Letters Patent of the United States Serial No. 88,768, filed by myself and another on July 3, 1936, for Light signals. Briefly described, this mechanism comprises a top plate 50 of insulating material having secured thereto a polarized electroresponsive means for operating between an intermediate and two extreme positions a spectacle arm 51 which projects upwardly through a slot in the top plate into an auxiliary casing 52 which is secured to the top plate. The spectacle arm 51 is provided at its upper end with green, yellow and red color screens which align respectively with two windows 53 and 54 of clear glass according as the spectacle arm occupies its one extreme position, its other extreme position or its intermediate extreme position. Only the red screen 55 is shown in the drawing, but spectacle arms of the type described are well-known, and it is therefore deemed to be unnecessary to show this spectacle arm in detail herein.

The mechanism is so positioned with respect to the casing 1 by suitable means forming no part of my present invention that the light rays emitted by the light unit A will pass through the windows 53 and 54 of the signal mechanism and the color screen which happens to be in alignment with these windows in the manner indicated by the dotted lines 56. It will be apparent, therefore, that the signal will display a green, red or yellow aspect according as the spectacle arm 50 occupies its one extreme position, its intermediate position or its other extreme position. The top plate 50 is provided with suitable terminal posts for the reception of plug connectors 57 to enable the signal to be readily connected with external circuits.

In utilizing the signal it is contemplated that all light units will be prefocused, that is, adjusted before they leave the factory, so that the conjugate foci will bear a fixed relation to the ball sockets, and it is also contemplated that the studs will be adjusted before the signal leaves the factory so that any unit which is subsequently snapped onto the stud will give maximum signal efficiency. In adjusting the studs, a prefocused light unit provided with a precision type lamp bulb is snapped onto the three ball studs and the studs are screwed in or out until the light beam projected by the signal has its maximum intensity. The ball studs are turned while making this adjustment by inserting a tool through the holes 45 in the arms 30, 31 and 32 in the manner pointed out hereinbefore. After the three ball studs have been screwed to the positions in which the strongest possible light beam is obtained, the lock nut 46 on each stud is tightened and the lock washer 47 is bent up around the nut, thereby preventing the nut from turning, and thus locking the ball studs in their adjusted positions.

With the signal constructed in the manner described, it will be apparent that the reflector assembly can be readily removed from, and snapped back onto the ball studs into its original position, thereby making the replacement of lamp bulbs a quick and easy operation. One of the supporting arms on the reflector assembly is shorter than the other two, thus making it impossible to install the light unit incorrectly. Since all light units are prefocused, a light unit can be replaced with another and the maximum optical efficiency of the signal will be maintained.

It will be noted from an inspection of the drawing that in order to remove the operating unit from the casing 1, it is necessary to first remove the light unit from the casing. Inasmuch as the light unit can readily be removed from the casing, the time required to replace the operating unit is greatly decreased.

One advantage of a light unit constructed in accordance with my invention is that regardless of the adjustment of the ball studs, all three studs will seat correctly in the associated socket of the light unit without any lost motion, or without any possibility of the light unit not returning to its adjusted position.

Although I have herein shown and described only one form of light signals embodying my invention, it is understood that various changes and modifications may be made therein within the scope of the appended claims without departing from the spirit and scope of my invention.

Having thus described my invention, what I claim is:

1. In a light signal the combination with a lens unit fixed in a housing and a light unit having a focal point which is adapted to coincide with the focal point of the lens unit, of means for attaching the light unit to the housing in such a way as to make the light unit readily detachable and also adjustable, with respect to the lens unit, said means comprising three screw threaded studs mounted in the housing and arranged in an irregular triangle including the axis of the signal and having spherical heads to define the plane of the light unit and each adjustable in the housing in a direction parallel with the axis of the signal to vary the inclination of the plane of the triangle, three sockets integral with the light unit for receiving the spherical heads of the studs and having spherical surfaces cooperating with the heads to allow relative movement of the sockets and the studs to permit inclination of the triangle, and means in each socket for yieldably gripping the spherical heads of said studs when they are in place in said sockets to detachably fasten said light unit to said studs, whereby by adjusting said studs the focal point of the light unit may be made to coincide with the focal point of the lens unit.

2. A light signal comprising a casing having an opening provided with a lens unit, three studs mounted in said housing around said opening and provided with spherical heads and each adjustable in a direction parallel with the axis of said lens unit, a light unit in said casing for supplying light to said lens unit, said light unit being provided with three sockets which are adapted to receive the heads of said studs to position said light unit in said casing, and means in each socket for yieldably gripping the spherical heads of said studs when they are in place in said sockets to detachably fasten said light unit to said studs, each said stud being provided in its outer end with means adapted to receive a tool for adjusting the stud and each said socket being provided with a hole through which access to the associated stud for adjustment purposes may be had when the light unit is in place on the studs.

WESLEY B. WELLS.